United States Patent [19]
Yancey

[11] 3,989,285
[45] Nov. 2, 1976

[54] COMPATIBLE VACUUM SEAL

[75] Inventor: Gary K. Yancey, Athens, Tex.

[73] Assignee: The United States of America as represented by the Secretary of the Army, Washington, D.C.

[22] Filed: Dec. 23, 1974

[21] Appl. No.: 535,241

[52] U.S. Cl. .......................... 285/336; 277/235 R; 285/363; 285/DIG. 18
[51] Int. Cl.² ........................................ F16L 23/00
[58] Field of Search ............. 285/336, DIG. 18, 363, 285/368, 364, 365, 366, 367; 277/235 R, 235 A, 236, 170, 171

[56] References Cited
UNITED STATES PATENTS

| 1,896,795 | 2/1933 | Kendall | 277/235 R X |
| 2,761,707 | 9/1956 | Herman | 277/236 X |
| 3,208,758 | 9/1965 | Carlson et al. | 285/336 X |
| 3,301,578 | 1/1967 | Platt et al. | 285/336 X |
| 3,747,963 | 7/1973 | Shivak | 285/336 |

FOREIGN PATENTS OR APPLICATIONS

| 6,961 | 7/1893 | Switzerland | 277/235 R |
| 712,786 | 7/1954 | United Kingdom | 277/235 A |

Primary Examiner—Thomas F. Callaghan
Attorney, Agent, or Firm—Nathan Edelberg; John E. Holford; Robert P. Gibson

[57] ABSTRACT

A compound sealing gasket is provided for vacuum line connectors which insures a tight seal and reduced galvanic reactions when the connectors consist of dissimilar metals.

6 Claims, 4 Drawing Figures

COMPATIBLE VACUUM SEAL

BACKGROUND OF THE INVENTION

High vacuum chambers capable of pressures in the $10^{-8}$ torr and lower range are now widely used, for example, in solid state electronic research. These chambers are usually made of stainless steel so that they will not oxidize when exposed to gases and vapors normally used in solid state work or when bake-out procedures at several hundred degrees are conducted. Vacuum pumps, gas generators and other peripheral devices are regularly connected and disconnected to ports on the chambers by means of bolted flanged couplings and sealing gaskets. The most effective seals have been used between two stainless steel couplings. The couplings are provided with knife edges and these bite into the gasket which is usually a washer of very pure copper alloy.

Occasionally it is necessary to couple a device, perhaps from another vacuum system, which is made of a different metal, e.g. aluminum. The resulting galvanic action between a metal gasket and the different metals on either side can easily result in contamination of a sample under study in the chamber, damage to the chamber or loss of vacuum. To prevent this some systems have been provided with grooved flanges and organic O-rings. Organic materials normally disintegrate at bake out temperature or give off gases that contaminate pure crystalline samples. The use of such O-rings is still further limited where multiple interconnections are involved due to the mechanical and chemical interactions which occur at operating temperatures. An object of the invention, therefore, is to provide a seal as reliable as those used in all stainless steel systems, by using metals mechanically and galvanically compatible with the particular system involved.

BRIEF DESCRIPTION OF THE INVENTION

The present invention provides an improved sealing structure which involves a modified flange arrangement and a novel sealing gasket which acts much like the stainless steel-copper structure described above. The sealing gasket is made of two materials which can include any two metals and even some non-metals having the chemical and mechanical qualities desired.

Figure 1:
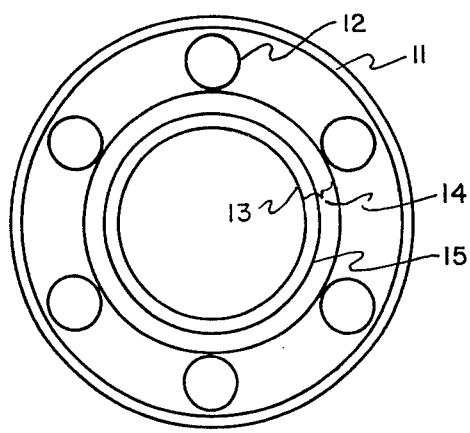
FIG. 1 shows a top view of one fitting for applicant's sealing structure.

Referring particularly to FIG. 1, a generally tubular flanged fitting is shown looking into the flange 11. A number of holes 12 are provided near the outer edge of the flange to accommodate the bolts (not shown) which pull two such flanges together. Between these holes and the central opening 13 of the flange is a recess 14 which is stepped to provide a knife edge 15 completely surrounding the central opening.

Figure 2:
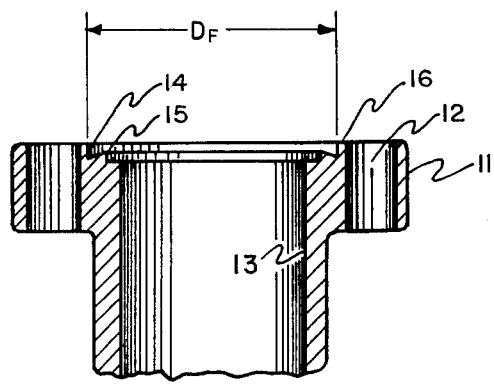
FIG. 2 shows the side view in section of the same fitting.

FIG. 2 shows the same elements from FIG. 1 in the upper part of a side view. The stepped portion appears as a ramplike structure, which rises radially inward on about a twenty degree incline toward the central opening from the extreme edge of the gasket recess. The ramp extends across about 60 percent of the radial dimension of the recess. The final 8 percent of the ramp at the knife edge can be flat and still impart adequate stress to deform the gasket without tearing it. The lower portion of the structure can be made in any form suitable to the vacuum chamber, pump, gas generator, etc. to which the coupling is attached. That portion can be permanently brazed or welded to the above mentioned structures, so that vacuum sealing is not a problem.

Figure 3:
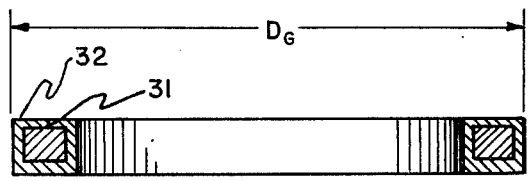
FIG. 3 shows the side view of a composite gasket for use with a pair of the fittings of FIGS. 1 and 2.

FIG. 3 shows a cross-sectional view of the gasket. The shape shown is toroidal to fit the circular flange of FIGS. 1 and 2. It is obvious to those skilled in the art that the shape can be adapted to square, rectangular, or any other configuration. The thickness dimension of the gasket is slightly less than twice the maximum depth of the recess shown in FIG. 2 and also has a diameter $D_G$ slightly less than the diameter $D_F$ (see FIG. 2) of that recess.

Figure 4:
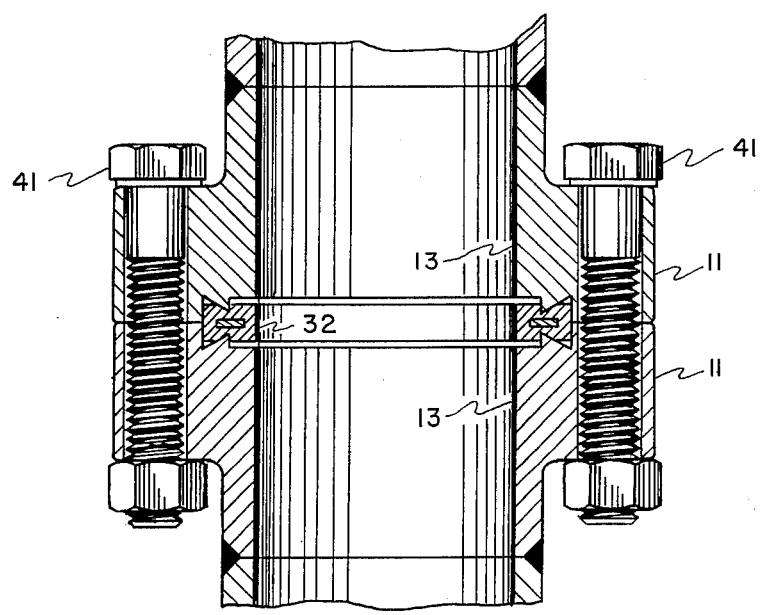
FIG. 4 shows two fittings bolted together with a composite gasket therebetween.

FIG. 4 shows that even though the gasket flows it does not interfere with the contact between mating surfaces 16 when two such flanges are drawn together. The gasket consists of a hard inner core surrounded by an outer layer of softer more ductile material. The thickness of the core is made approximately equal to the spacing between a pair of the knife edges when two such flanges are tightly secured by bolts 41, minus the thickness of outer layer 32. Since two portions of the layer contribute to the thickness of the gasket the knife edges will penetrate through about half of each portion and not touch the core.

The core material can thus be chosen for its mechanical strength properties while the material for outer layer 32 can be chosen for its ductility and low galvanic activity relative to the flange or knife material, if the latter is a separate element. The hardness ratio of the outer layer to the knife should not exceed 0.4 to insure proper sealing after repeated use of the same knife. The outer layer 32 should not contain lead, zinc or calcium except in trace quantities, and should be mechanically stable between 77° and 373° K. The vapor pressure of the gasket layer material should not be more than two orders of magnitude greater than the material in the knife to avoid contamination of the evacuated chamber. The invention works well with flange materials having a Brinell hardness greater than 65. For example a stainless steel pump assembly was coupled to an aluminum chamber and an aluminum relief valve, the latter having Brinell hardnesses of 95. The gasket consisted of a core of OFHC copper (Brinell 95) coated with tin (Brinell 8). At vacuums of $5 \times 10^{-8}$ torr the leakage was less than $10^{-10}$ std cm$^3$ per second over the temperature range of 77°–373° K.

Obviously many variations of the above described structures will be obvious to those skilled in the art, but the present invention is limited only by the claims which follow.

I claim:

1. In a high vacuum system an improved coupling between two adjacent elements comprising:
   a pair of identical fittings each permanently attached to one of said elements and having coupling flanges surrounding a central aperture opening into said element the opposing surfaces of said flanges each defining a continuous outer contact surface and an inner continuous stepped recess surrounding said central aperture;

a pair of continuous knife members with spaced opposed cutting edges each of ramp shaped cross-section with a height less than the depth of said recesses mounted in said recesses;

a continuous gasket located in said recesses between said knife members having a hard central core member with a thickness less than the spacing between said knife members when said outer contact surfaces are in abutment and a softer outer layer with a thickness greater than the spacing between said core member and each adjacent knife member; and means to draw said flanges together until said contact surfaces meet whereby said knife members penetrate said outer layer but do not engage said central core member.

2. The system according to claim 1 wherein:
the ratio of hardness of said outer layer to said knife member is less than 0.4.

3. The system according to claim 1 wherein:
said outer layer is mechanically stable between 77° and 373° K.

4. The system according to claim 1 wherein:
the vapor pressure of said outer layer is less than two orders of magnitude greater than said knife member.

5. The system according to claim 1 wherein:
said knife is defined by a pair of coaxial intersecting cylindrical and conical surfaces having a minimal angle therebetween of approximately 80°.

6. The system according to claim 1 wherein:
the thickness of said layer is approximately twice the spacing between said core member and one of said knife members.

* * * * *